(12) United States Patent
Tong et al.

(10) Patent No.: US 10,214,137 B2
(45) Date of Patent: Feb. 26, 2019

(54) DUAL COLOR TEMPERATURE VEHICLE LAMP ABLE TO JUDGE DRIVING ENVIRONMENT BASED ON INVISIBLE LIGHT AND JUDGING METHOD

(71) Applicant: Leiman Lighting (DongGuan) Tech. Limited, Dongguan (CN)

(72) Inventors: Jianhua Tong, Dongguan (CN); Yucheng Lin, Dongguan (CN)

(73) Assignee: LEIMAN LIGHTING (DOGGUAN) TECH. LIMITED, Dongguan, Guangdong Province (CN)

( * ) Notice: Subject to any disclaimer, the term of this patent is extended or adjusted under 35 U.S.C. 154(b) by 0 days.

(21) Appl. No.: 15/600,568

(22) Filed: May 19, 2017

(65) Prior Publication Data

US 2018/0272923 A1  Sep. 27, 2018

(30) Foreign Application Priority Data

Mar. 27, 2017  (CN) .......................... 2017 1 0188645

(51) Int. Cl.
*B60Q 1/00* (2006.01)
*B60Q 1/14* (2006.01)
*G01J 1/44* (2006.01)

(52) U.S. Cl.
CPC .............. *B60Q 1/1423* (2013.01); *G01J 1/44* (2013.01); *B60Q 2300/312* (2013.01); *B60Q 2900/30* (2013.01); *G01J 2001/4473* (2013.01)

(58) Field of Classification Search
None
See application file for complete search history.

(56) References Cited

U.S. PATENT DOCUMENTS

| 2002/0030592 A1* | 3/2002 | Hakanen | B60C 23/0408 340/442 |
| 2012/0274745 A1* | 11/2012 | Russell | G06F 3/013 348/46 |
| 2015/0253950 A1* | 9/2015 | Onaka | G06F 3/023 345/184 |

* cited by examiner

*Primary Examiner* — Douglas W Owens
*Assistant Examiner* — Jianzi Chen
(74) *Attorney, Agent, or Firm* — Ming Chow; Sinorica, LLC

(57) ABSTRACT

A dual color temperature vehicle lamp able to judge a driving environment based on invisible light includes a vehicle lamp body in the form of an LED. The vehicle lamp body includes a light emitting unit capable of performing a conversion of at least two kinds of color temperature light. A front end face of the vehicle lamp body is provided with at least one invisible light emitting source, at least one reflected light receiver, and a partition plate between the invisible light emitting source and the reflected light receiver. The invisible light emitting source is embedded in a recess at a front end of the vehicle lamp body. The vehicle lamp body includes a preamplifier circuit connected with the reflected light receiver, an MCU connected with the preamplifier circuit, and a wireless transceiver module connected with the MCU therein.

3 Claims, 3 Drawing Sheets replacement sheet

DUAL COLOR TEMPERATURE VEHICLE LAMP ABLE TO JUDGE DRIVING ENVIRONMENT BASED ON INVISIBLE LIGHT AND JUDGING METHOD

FIELD OF THE INVENTION

The present invention relates to an automotive lighting, and more particularly to a dual color temperature vehicle lamp able to judge the current driving environment to realize an automatic color temperature conversion function and a method to judge the driving environment based on invisible light.

BACKGROUND OF THE INVENTION

A vehicle lamp is the main lighting source when driving, which is very important to the traffic safety, especially in a windy, rainy or foggy day or at night. The vehicle light plays a very important role in the traffic when driving. Color temperature and brightness are the main indicators of the performance of the vehicle lamp. The brightness is subject to the working power and the working mode of the vehicle lamp. The current popular LED vehicle lamps have better brightness, meeting the demands for driving. Another major parameter, color temperature, will affect people's visual perception to observe the road conditions. Color temperature also affects the light penetrability to the surroundings. In the rain, fog, haze, or snow, low color temperature can effectively improve the light penetrability to the surroundings compared to high color temperature, thereby improving the traffic safety in the aforesaid environments. In the sunny environment, high color temperature is more close to the sun, which is beneficial for observing the road conditions. In different environments, the demand for the color temperature of the vehicle lamp is different. However, most of the existing vehicle lamps do not have a color temperature conversion function, not meeting different demands for different environments.

Although some of vehicle lamps has a color temperature conversion function, but it is implemented by a manual operation. It is inconvenient for operation. During driving, the manual operation for switching the color temperature of the vehicle lamp may distract the driver to cause an accident. Accordingly, the inventor of the present invention has devoted himself based on his many years of practical experiences to solve these problems.

SUMMARY OF THE INVENTION

The primary object of the present invention is to overcome the shortcomings of the prior art and to provide a dual color temperature vehicle lamp and a judging method by using invisible light having a specific wavelength, realizing a cost-effective driving environment judgment.

According to an aspect of the present invention, a dual color temperature vehicle lamp able to judge a driving environment based on invisible light is provided. The dual color temperature vehicle lamp comprises a vehicle lamp body in the form of an LED. The vehicle lamp body includes a light emitting unit capable of performing a conversion of at least two kinds of color temperature light. A front end face of the vehicle lamp body is provided with at least one invisible light emitting source, at least one reflected light receiver, and a partition plate between the invisible light emitting source and the reflected light receiver. The invisible light emitting source is embedded in a recess at a front end of the vehicle lamp body and has a front end not beyond the front end face of the vehicle lamp body. The vehicle lamp body includes a preamplifier circuit connected with the reflected light receiver, an MCU (Microprogrammed Control Unit) connected with the preamplifier circuit, and a wireless transceiver module connected with the MCU therein.

Preferably, the invisible light emitting source is a light emitting diode able to emit light having a wavelength of less than 400 nm or greater than 760 nm.

Preferably, the reflected light receiver is a phototransistor.

Preferably, the vehicle lamp body is provided with two LED lamp beads with different color temperatures, or the vehicle lamp body is provided with an LED lamp bead having a dual color temperature conversion function.

Preferably, the wireless transceiver module is an RF433 module.

According to another aspect of the present invention, a dual color temperature vehicle lamp able to judge a driving environment based on invisible light is provided. The dual color temperature vehicle lamp comprises a vehicle lamp body and a control box. The vehicle lamp body is communicated with the control box by radio frequency signals. The vehicle lamp body includes a light emitting unit capable of performing a conversion of at least two kinds of color temperature light. The vehicle lamp body comprises a light emission control circuit and a wireless transceiver module therein. At least one invisible light emitting source, at least one reflected light receiver, and a partition plate between the invisible light emitting source and the reflected light receiver are provided on the control box. The control box includes a preamplifier circuit connected with the reflected light receiver, an MCU (Microprogrammed Control Unit) connected with the preamplifier circuit, and another wireless transceiver module connected with the MCU therein.

Preferably, the control box is provided with a battery.

Preferably, the control box is mounted on a front windshield of a vehicle.

According to a further aspect of the present invention, a method for regulating a color temperature of a vehicle lamp based on invisible light is provided. The method comprises the following steps of:

step 1: in a working state when the vehicle lamp is turned on, an invisible light emitting source to emitting light having a wavelength of less than 400 nm or greater than 760 nm, the invisible light carrying a 38 KHZ signal;

step 2: in the working state when the vehicle lamp is turned on, a reflected light receiver receiving ambient light and converting a received signal of the ambient light into an electrical signal to amplify the signal, with 5V as a maximum value, the amplified signal being proceeded to identify a target light signal carrying the 38 KHZ signal and calculate a voltage intensity value of the received target light signal;

step 3: a processing chip making a comparison for the voltage intensity value obtained in the step 2, wherein when the voltage intensity value is less than 1V, the value of the electrical signal is ignored; when the voltage intensity value is 1-2V, it is judged that the weather is rainy or foggy and the vehicle lamp is controlled to regulate its color temperature; when the voltage intensity value is greater than 2V, the value of the electrical signal is ignored; and step 4: the processing chip getting a control judgment through the step 3 and converting the control judgment into a control signal to the vehicle lamp and controlling a working color temperature of the vehicle lamp.

Preferably, the processing chip in the step 4 is communicated with each vehicle lamp body by means of a radio frequency signal or a wired connection.

Preferably, the invisible light in the step 2 is ultraviolet light.

Preferably, in the step 3, when it is judged that the weather is rainy or foggy, the working color temperature of the vehicle lamp is low color temperature.

When the present invention is in use, the automatic detection and determination of the driving environment of the vehicle lamp is realized by the invisible light. By using the characteristic of poor penetration of the invisible light, it is possible to make a quick judgment on the light transmittance in front of the vehicle lamp and judge whether it is necessary to switch the color temperature having strong penetration so as to ensure the traffic safety.

The present invention has the advantages of a simple structure, a reasonable design, a low cost, a good effect, a high accuracy of judgment, and is advantageous for popularization and use compared with other judgment schemes.

The present invention has the advantages of a simple structure and a reasonable design. Compared to other judgment schemes, the cost of use is low and the effect is better and the accuracy of judgment is high. This is advantageous for popularization and use.

DESCRIPTION OF THE PREFERRED EMBODIMENTS

Advantages and features of the inventive concept and methods of accomplishing the same may be understood more readily by reference to the following detailed description of embodiments and the accompanying drawings.

Figure 1:
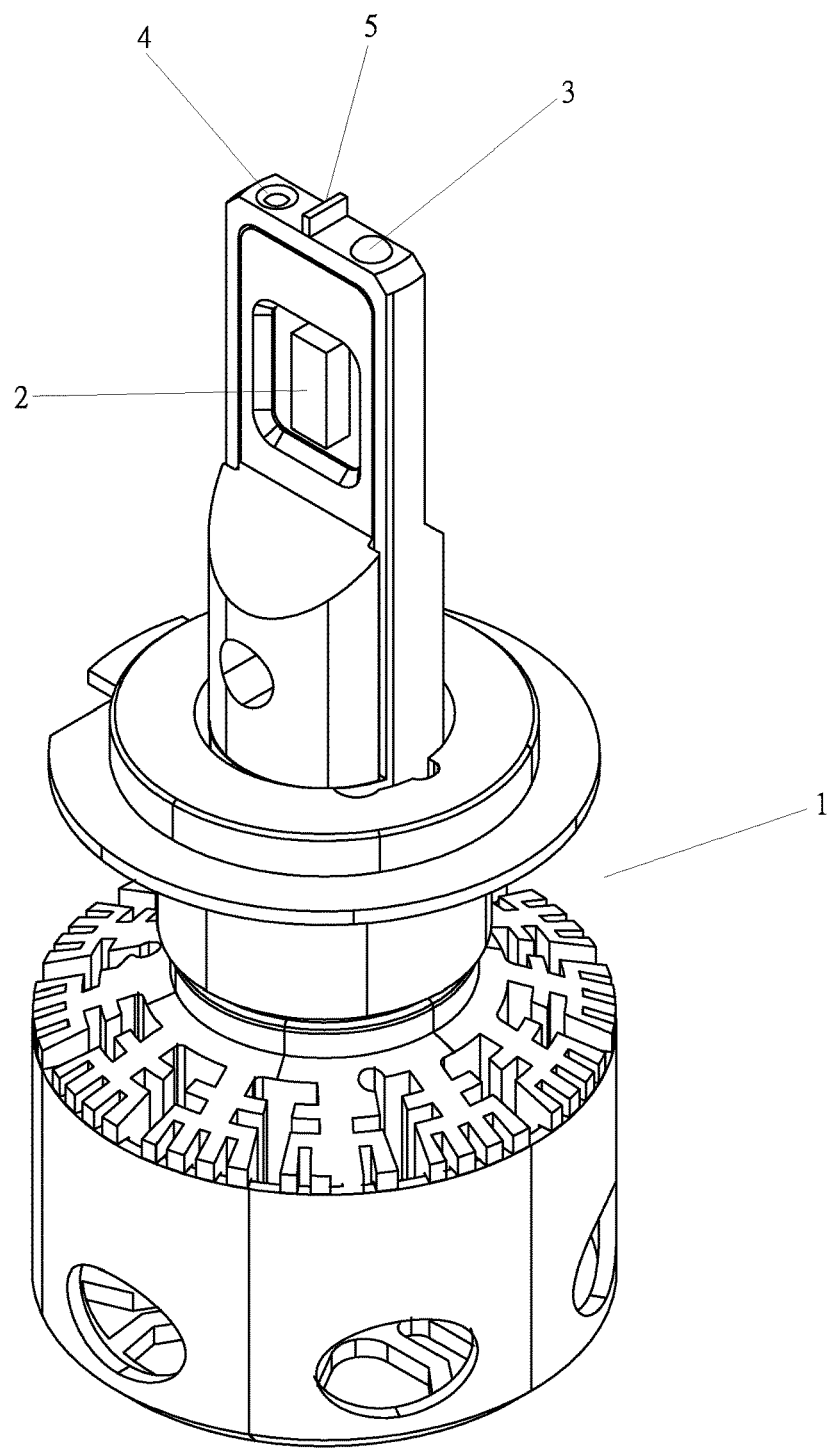
FIG. 1 is a perspective view of a dual color temperature vehicle lamp according to a first embodiment of the present invention.

FIG. 1 is a perspective view of a dual color temperature vehicle lamp according to a first embodiment of the present invention. As shown in FIG. 1, the present invention comprises a vehicle lamp body 1 in the form of an LED. The vehicle lamp body 1 includes a light emitting unit 2 capable of performing a conversion of at least two kinds of color temperature light. A front end face of the vehicle lamp body 1 is provided with at least one invisible light emitting source 3, at least one reflected light receiver 4, and a partition plate 5 between the invisible light emitting source 3 and the reflected light receiver 4. The invisible light emitting source 3 is embedded in a recess at the front end of the vehicle lamp body 1, having a front end not beyond the front end face of the vehicle lamp body 1. The vehicle lamp body 1 includes a preamplifier circuit connected with the reflected light receiver 4, an MCU (Microprogrammed Control Unit) connected with the preamplifier circuit, and a wireless transceiver module connected with the MCU therein. The invisible light emitting source 3 is an ultraviolet light emitting diode, and the emitted light wavelength is 400 nm. The reflected light receiver 4 is a phototransistor. The vehicle lamp body 1 is provided with an LED lamp bead having a dual color temperature conversion function. The wireless transceiver module is an RF433 module.

When in use, the phototransistor is used to receive the ambient light which may be blocked by particles in the air, water droplets, and the environment itself and converts the received signal into an electric signal to the amplifier circuit. The amplified circuit amplifies the signal by a preset multiple, and the amplified signal is sent to some of the pins of the MCU. The MCU analyzes the electrical signal to judge the 38 KHZ electrical signal. The voltage intensity value of the signal value is recorded, and the working color temperature of the light emitting unit in the vehicle lamp body is controlled by the comparison result according to the voltage intensity value. The RF433 module is used to wirelessly control the working state of another vehicle lamp having a built-in R433 module and a dual color temperature conversion function so as to realize a synchronous color temperature conversion of two vehicle lamps.

Figure 2:
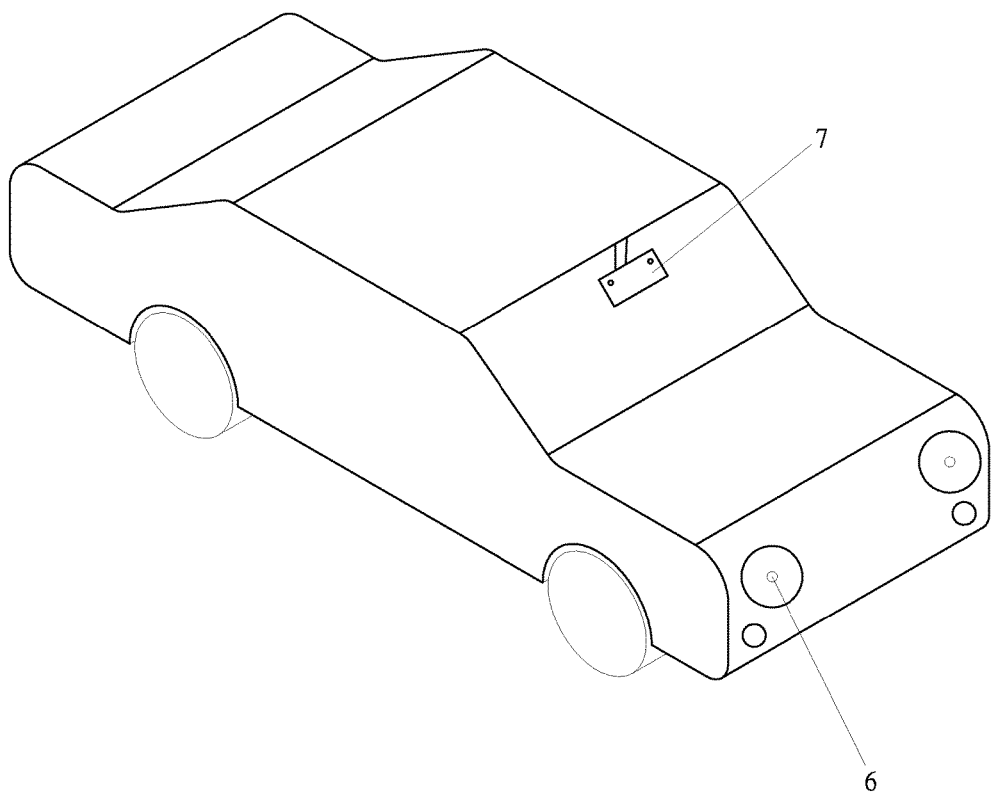
FIG. 2 is a schematic view according to a second embodiment of the present invention.
Figure 3:
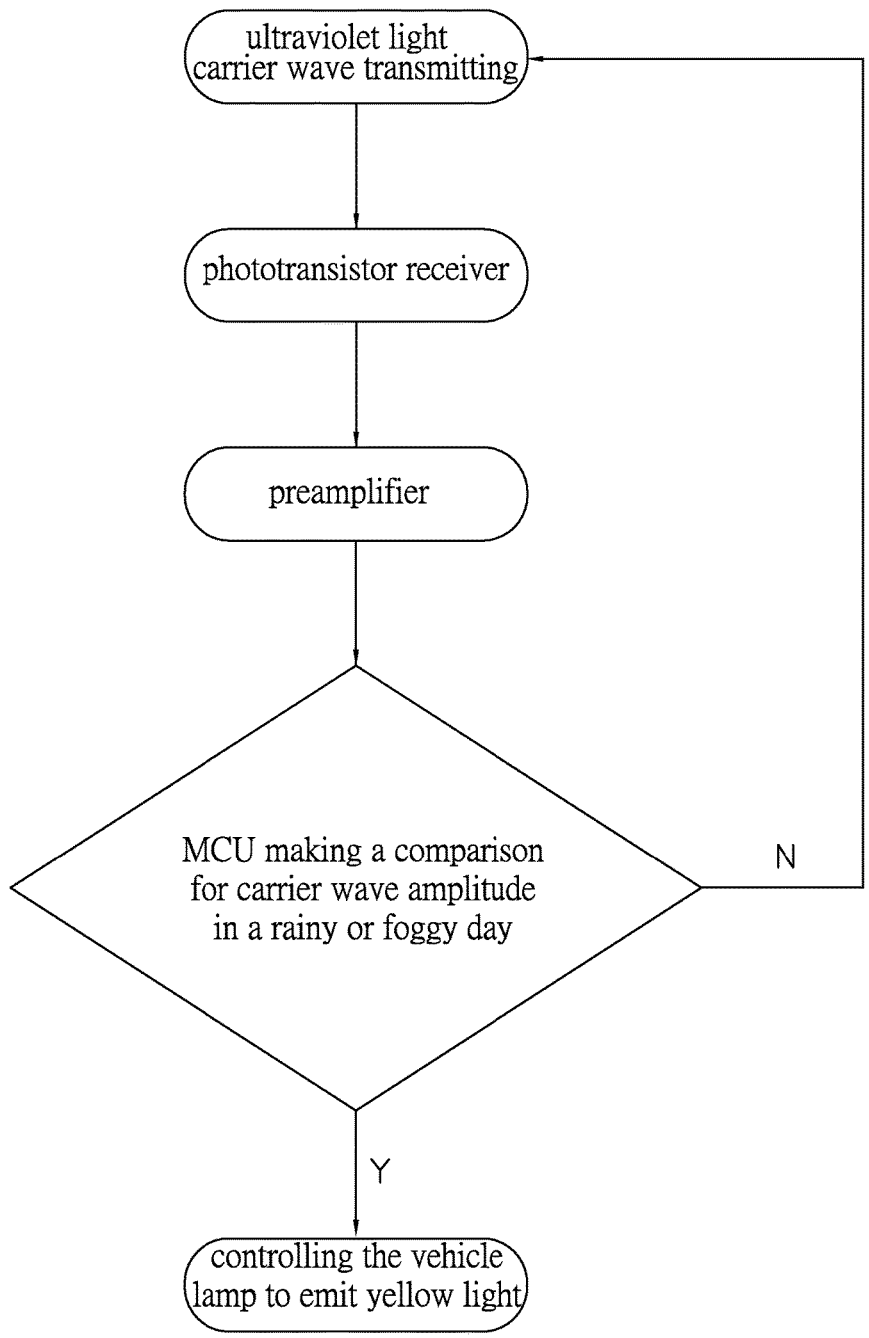
FIG. 3 is a working flow chart of the present invention.

FIG. 2 is a schematic view according to a second embodiment of the present invention. As shown in FIG. 2, the present invention includes a vehicle lamp body 6 and a control box 7. The vehicle lamp body 6 is communicated with the control box 7 by radio frequency signals. The vehicle lamp body 1 includes a light emitting unit 2 capable of performing a conversion of at least two kinds of color temperature light. The vehicle lamp body 6 comprises a light emission control circuit and a wireless transceiver module therein. At least one invisible light emitting source, at least one reflected light receiver, and a partition plate between the invisible light emitting source and the reflected light receiver are provided on the control box 7. The control box 7 includes a preamplifier circuit connected with the reflected light receiver, an MCU (Microprogrammed Control Unit) connected with the preamplifier circuit, and another wireless transceiver module connected with the MCU therein.

When in use, the invisible light emitting source of the control box 7 emits ultraviolet light of 350 nm and converts the received signal into an electronic signal to the amplifier circuit. The amplified circuit amplifies the signal by a preset multiple, and the amplified signal is sent to some of the pins of the MCU. The MCU analyzes the electrical signal to judge the 38 KHZ electrical signal. The voltage intensity value of the signal value is recorded according to the voltage intensity value to make a comparison, and the comparison result is transmitted to the vehicle lamp body 6 through the RF433, thereby realizing a synchronous color temperature conversion of two vehicle lamp bodies 6.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for regulating a color temperature of a vehicle lamp based on invisible light, comprising the following steps of:

step 1: in a working state when the vehicle lamp is turned on, an invisible light emitting source to emitting light having a wavelength of less than 400 nm or greater than 760 nm, the invisible light carrying a 38 KHZ signal;

step 2: in the working state when the vehicle lamp is turned on, a reflected light receiver receiving ambient light and converting a received signal of the ambient light into an electrical signal to amplify the signal, with 5V as a maximum value, the amplified signal being proceeded to identify a target light signal carrying the 38 KHZ signal and calculate a voltage intensity value of the received target light signal;

step 3: a processing chip making a comparison for the voltage intensity value obtained in the step 2, wherein when the voltage intensity value is less than 1V, the value of the electrical signal is ignored; when the voltage intensity value is 1-2V, it is judged that the weather is rainy or foggy and the vehicle lamp is controlled to regulate its color temperature; when the voltage intensity value is greater than 2V, the value of the electrical signal is ignored; and step 4: the processing chip getting a control judgment through the step 3 and converting the control judgment into a control signal to the vehicle lamp and controlling a working color temperature of the vehicle lamp.

2. The method as claimed in claim 1, wherein the processing chip in the step 4 is communicated with each vehicle lamp body by means of a radio frequency signal or a wired connection.

3. The method as claimed in claim 1, wherein the invisible light in the step 2 is ultraviolet light.

\* \* \* \* \*